Figures 1, 3, 4:
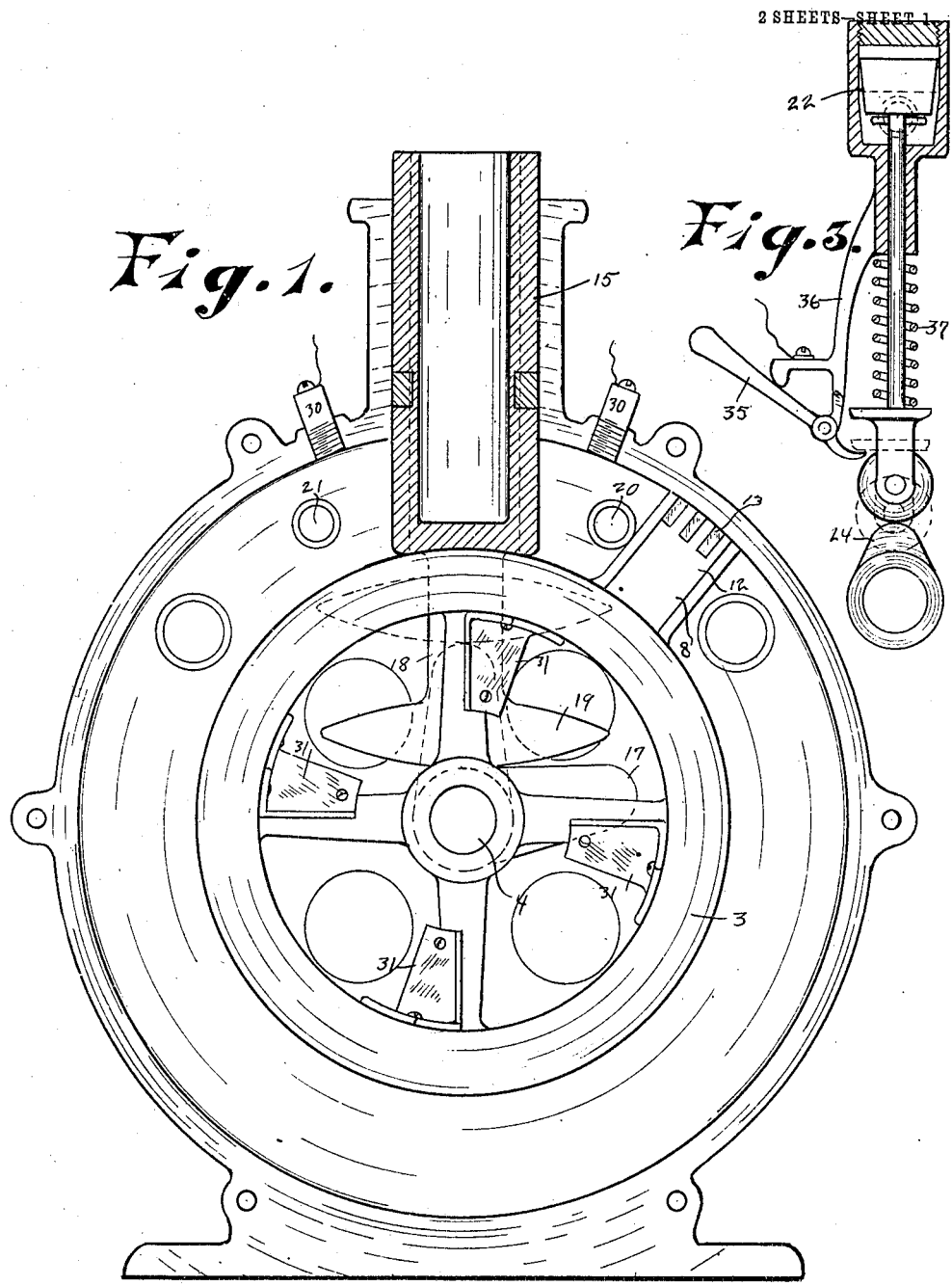

No. 871,125. PATENTED NOV. 19, 1907.
W. LAUBER.
ROTARY ENGINE.
APPLICATION FILED APR. 15, 1907.

2 SHEETS—SHEET 1.

WITNESSES:
INVENTOR
William Lauber
BY
Erwin & Wheeler
ATTORNEYS

No. 871,125. PATENTED NOV. 19, 1907.
W. LAUBER.
ROTARY ENGINE.
APPLICATION FILED APR. 15, 1907.
2 SHEETS—SHEET 2.
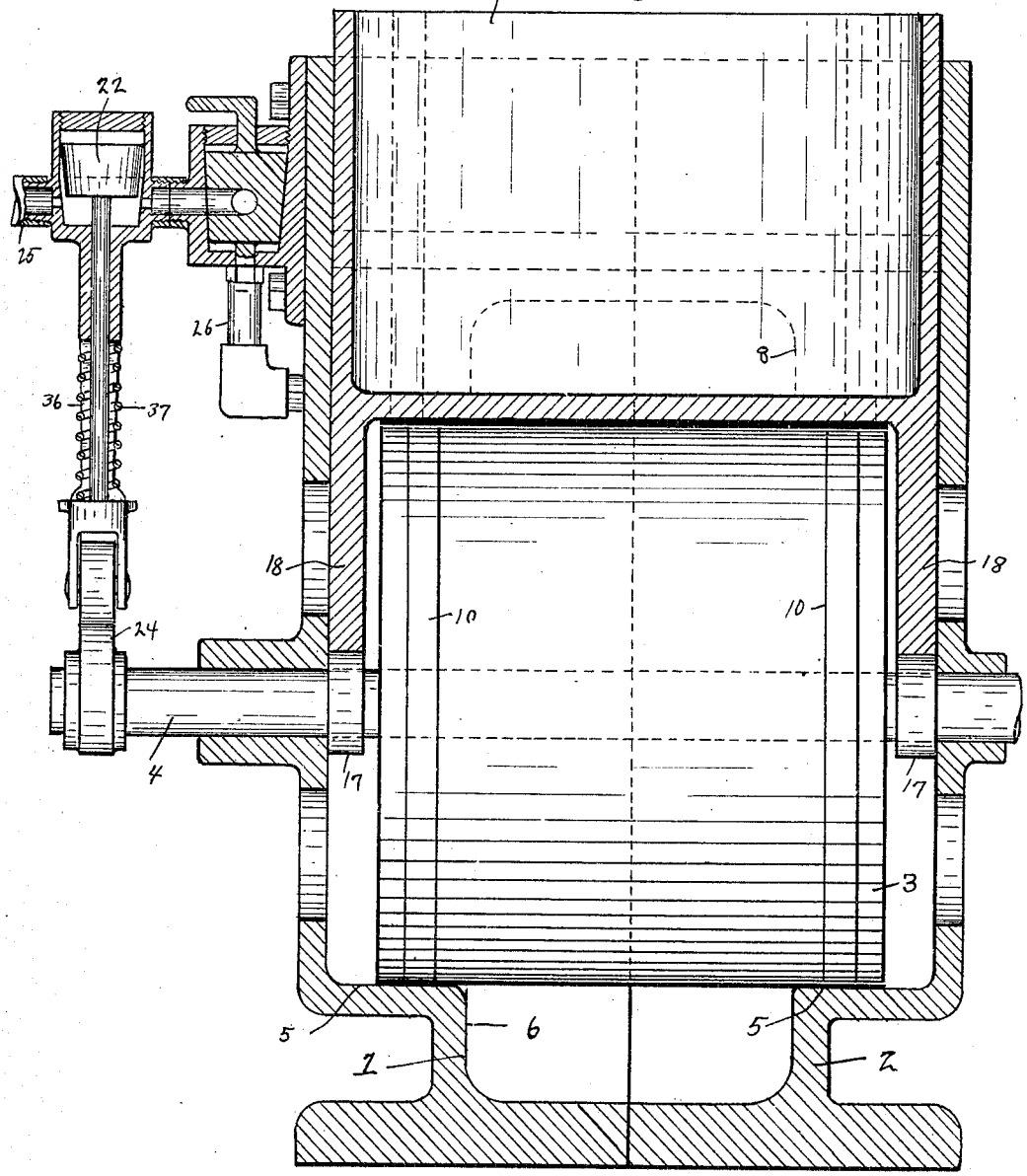
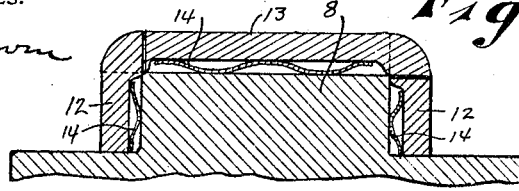
WITNESSES:
INVENTOR
William Lauber
BY
Erwin & Whaler
ATTORNEYS

UNITED STATES PATENT OFFICE.

WILLIAM LAUBER, OF MILWAUKEE, WISCONSIN, ASSIGNOR OF ONE-SEVENTH TO LOUIS REIMER, ONE-SEVENTH TO JOHN HRDLICKA, ONE-SEVENTH TO WILLIAM ARNDT, ONE-SEVENTH TO HENRY PATZKE, ONE-SEVENTH TO ELMER WANGERIN, AND ONE-SEVENTH TO CHARLES BORCHERT, ALL OF MILWAUKEE, WISCONSIN.

ROTARY ENGINE.

No. 871,125.  Specification of Letters Patent.  Patented Nov. 19, 1907.

Application filed April 15, 1907. Serial No. 368,153.

*To all whom it may concern:*

Be it known that I, WILLIAM LAUBER, a citizen of the United States, residing at Milwaukee, county of Milwaukee, and State of Wisconsin, have invented new and useful Improvements in Rotary Engines, of which the following is a specification.

My invention relates to improvements in rotary engines designed to be used with steam, gas, compressed air or any other form of elastic or explosive medium.

The object of my invention is to provide a structure of the described class in which the gate will be positively raised and lowered through power from the engine shaft, whereby re-action is avoided and the destructive effects of pounding on the rotary cylinder prevented.

A further object of my invention is to provide means whereby packing rings may be employed to prevent the escape of the motive fluid at the ends of the cylinder, regard being also had for efficient packing at the sides and ends of the gate and piston, and positive control of the admission of motive fluid in synchronism with the closing movement of the gate.

In the following description, reference is had to the accompanying drawings in which Figure 1 is a cross sectional view drawn to a plane cutting the gate and gas inlets. Fig. 2 is a central vertical sectional view drawn to a plane which includes the axis of rotation. Fig. 3 is a detail view of the admission valve and valve mechanism. Fig. 4 is a detail view of the reversing valve and branch ducts leading to the direct inlet and reversing ports respectively. Fig. 5 is a detail view of the piston, showing the interacting packing strips.

Like parts are identified by the same reference characters throughout the several views.

A casing, formed in two sections, 1 and 2, incloses a rotary cylindrical drum 3 mounted upon a shaft 4. The interior chamber of the casing is cylindrical in form with reduced end portions 5 substantially equal in diameter to that of the drum 3, and a central portion of larger diameter, forming an annular channel 6 surrounding the central portion of the drum. A piston 8, mounted on the drum, is adapted to travel in this channel, and the ends of the drum are provided with packing rings 10 fitting the reduced end portions 5 of the casing chamber to prevent the escape of the motive fluid. The sides and ends of the piston are also provided with packing strips 12 and 13, interacting at their meeting ends, and fitting the walls of the channel 6 and preferably expanded against such walls by springs 14 seated in such channels.

A movable abutment 15 is mounted in suitable guide ways in the casing, and is adapted to move downwardly across the channel 6 into contact with the drum 3, the abutment preferably having sufficient weight to move to such position by gravity. This abutment is lifted to permit the piston to pass, by means of cams 17, one mounted on the shaft at each end of the drum, and adapted to actuate the gate through posts 18 which are connected with the gate and provided with shoes 19 for contact with the cam. The under surfaces of the shoes 19 are preferably rounded as shown, to provide a bearing for the cams.

Inlet ports 20 and 21 are provided on opposite sides of the gate and the admission of motive fluid is regulated by means of valve 22 actuated from the shaft by cam 24. A main supply pipe 25 is provided with branches 26 leading to the inlets 20 and 21, and a manually controlled valve 27 is located at the junction of the main with these branches, whereby the flow of motive fluid to either branch may be controlled. It will be understood that the fluid is cut off from one branch and admitted to the other to reverse the engine.

30 are igniters adapted to be employed where an internal combustion is desired and 31 are fan wings arranged to direct cooling air currents through the drum, the ends of which are open as is also the casing, near the axis.

35 is a starting lever fulcrumed to a bracket 36 and adapted to lift the valve against the tension of the valve closing spring 37.

Having thus described my invention, what I claim as new and desire to secure by Letters Patent is;

1. In a rotary engine, the combination of a casing provided with a cylindrical chamber having reduced end portions, a shaft extending axially through the cylindrical chamber, a drum mounted on the shaft, with its end portions substantially fitting the end portions of the chamber and provided with packing rings, a piston mounted upon the middle portion of the drum and fitting the larger portion of the chamber, a gate mounted in suitable guides within the chamber and adapted to move radially into and out of contact with the drum, cam actuated gate supporting posts at the respective ends of the drum, and cams mounted on the shaft in a position to actuate said posts.

2. In a rotary engine the combination with a casing provided with reduced end portions and a rotary shaft extending there through a drum mounted on the shaft with its end portions fitting the reduced portions of the casing, and a piston on the drum,—of a reciprocating gate mounted in suitable guides in the casing and provided with inwardly projecting radial posts at each end of the drum and within the casing, and cams on the shaft at the respective ends of the drum arranged to actuate said posts outwardly to permit the passage of the piston.

3. A rotary engine comprising a cylindrical chamber provided with a suitable valved admission port, an axially disposed shaft in the chamber, a piston supported therefrom and fitting said chamber, and a retractable gate normally in the path of the piston,—said gate having inwardly projecting radial posts and the shaft being provided with cams adapted to move said posts outwardly to retract the gate, to clear the piston once during each revolution.

4. A rotary engine comprising a cylindrical chamber provided with a suitable valved admission port, an axially disposed shaft in the chamber, a piston supported therefrom and fitting said chamber, and a retractable gate normally in the path of the piston,—the gate being provided with inwardly projecting radial posts and the shaft being provided with cams adapted to move said posts outwardly to retract the gate, to clear the piston once during each revolution, together with another cam mounted on the shaft and arranged to control the flow of motive fluid through the valved admission port.

In testimony whereof I affix my signature in the presence of two witnesses.

WILLIAM LAUBER.

Witnesses:
LEVERETT C. WHEELER,
HENRY PATZKE.